United States Patent
Seth et al.

(10) Patent No.: US 11,275,770 B2
(45) Date of Patent: Mar. 15, 2022

(54) PARALLELIZATION OF NODE'S FAULT TOLERENT RECORD LINKAGE USING SMART INDEXING AND HIERARCHICAL CLUSTERING

(71) Applicant: INTERNATIONAL BUSINESS MACHINES CORPORATION, Armonk, NY (US)

(72) Inventors: Abhishek Seth, Distt. Saharanpur (IN); Soma Shekar Naganna, Bangalore (IN); Matheen Ahmed Pasha, Bangalore (IN); Pushpalatha M. Hiremath, Bangalore (IN); Arvind S. Shetty, Bangalore (IN); Subramanian Palaniappan, Tamil Nadu (IN)

(73) Assignee: INTFRNATIONAL BUSINESS MACHINES CORPORATION, Armonk, NY (US)

( * ) Notice: Subject to any disclaimer, the term of this patent is extended or adjusted under 35 U.S.C. 154(b) by 172 days.

(21) Appl. No.: 16/376,592

(22) Filed: Apr. 5, 2019

(65) Prior Publication Data

US 2020/0320101 A1 Oct. 8, 2020

(51) Int. Cl.
*G06F 16/00* (2019.01)
*G06F 16/28* (2019.01)
(Continued)

(52) U.S. Cl.
CPC ........ *G06F 16/285* (2019.01); *G06F 16/2255* (2019.01); *G06F 16/2379* (2019.01)

(58) Field of Classification Search
CPC . G06F 16/2255; G06F 16/2379; G06F 16/285
(Continued)

(56) References Cited

U.S. PATENT DOCUMENTS 5,921,582 A 7/1999 Gusack
7,689,602 B1 * 3/2010 Sim-Tang ........... G06F 16/2246
707/673
(Continued)

FOREIGN PATENT DOCUMENTS

WO 2016188587 A1 12/2016

OTHER PUBLICATIONS

Mamun et al., "Efficient sequential and parallel algorithms for record linkage", J Am Med Inform Assoc, 2014; 21, pp. 252-262.
(Continued)

*Primary Examiner* — Michelle N Owyang
(74) *Attorney, Agent, or Firm* — William Hartwell; Andrew D. Wright; Roberts Calderon Safran & Cole, P.C.

(57) ABSTRACT

Embodiments include a computer-implemented method including identifying, by a primary computer device, a plurality of records, each record having one or more attributes; standardizing, by the primary computer device, each of the plurality of records; assigning, by the primary computer device, an index to one or more of the one or more attributes; providing, by the primary computer device, instructions for clustering the standardized plurality of records in parallel into one or more clusters, each cluster including records having the same index, the one or more clusters being in a group; receiving, by the primary computer device, one or more groups, each group including one or more clusters sharing a same index; and linking one or more of the plurality of records in a cluster with another one or more of the plurality of records in another cluster within a same group.

20 Claims, 10 Drawing Sheets

(51) Int. Cl.
  *G06F 16/23* (2019.01)
  *G06F 16/22* (2019.01)
(58) Field of Classification Search
  USPC .................................................. 707/705–780
  See application file for complete search history.

(56) References Cited

U.S. PATENT DOCUMENTS

| | | | |
|---|---|---|---|
| 7,912,842 B1 | 3/2011 | Bayliss | |
| 9,384,238 B2 | 7/2016 | Ray et al. | |
| 2006/0179050 A1 | 8/2006 | Giang et al. | |
| 2007/0078856 A1* | 4/2007 | Dettinger | G16H 10/60 |
| 2014/0304266 A1* | 10/2014 | Leuoth | G06F 16/22 |
| | | | 707/737 |
| 2017/0293672 A1* | 10/2017 | Miller | G06F 16/258 |
| 2017/0344588 A1* | 11/2017 | Horowitz | G06F 16/2228 |
| 2018/0121535 A1 | 5/2018 | Oberhofer et al. | |
| 2018/0165740 A1* | 6/2018 | Jadhav | G06F 16/9535 |
| 2020/0242095 A1* | 7/2020 | Malik | G06F 16/221 |

OTHER PUBLICATIONS

Borallo et al.,"Exploring hybrid parallel systems for probabilistic record linkage", J Supercomput, Mar. 21, 2018, 16 pages, https://doi.org/10.1007/s11227-018-2328-3.

Becker, "Basic Record Linkage with Parallel Processing", Nick Becker, <https://beckernick.github.io/parallel-record-linkage/>, Accessed Mar. 25, 2019, 9 pages.

Mamun et al., "Efficient Record Linkage Algorithms Using Complete Linkage Clustering", PLOS One, Apr. 28, 2016, 21 pages.

Christen et al., "Parallel computing techniques for high-performance probabilistic record linkage", Symposium on Health Data Linkage, <https://pdfs.semanticscholar.org/459a/1e3b3a8d793f214d1b665363091efd317621.pdf>, Accessed Mar. 25, 2019, 7 pages.

Mell et al., "The NIST Definition of Cloud Computing", NIST, Special Publication 800-145, Sep. 2011, 7 pages.

\* cited by examiner

PARALLELIZATION OF NODE'S FAULT TOLERENT RECORD LINKAGE USING SMART INDEXING AND HIERARCHICAL CLUSTERING

BACKGROUND

The present invention relates generally to record linkage and, more particularly, to parallelized record linkage.

Record linkage is the task of finding records in a data set that refer to the same entity across different data sources such as data files, books, websites, and databases. Record linkage is advantageous when joining data sets based on entities that may share a common identifier but have differences in record shape, storage location or preference. Typically, record linkage is performed in a sequential manner.

SUMMARY

In a first aspect of the invention, there is a computer-implemented method including identifying, by a primary computer device, a plurality of records, each record having one or more attributes; standardizing, by the primary computer device, each of the plurality of records; assigning, by the primary computer device, an index to one or more of the one or more attributes; providing, by the primary computer device, instructions for clustering the standardized plurality of records in parallel into one or more clusters, each cluster including records having the same index, the one or more clusters being in a group; receiving, by the primary computer device, one or more groups, each group including one or more clusters sharing a same index; and linking one or more of the plurality of records in a cluster with another one or more of the plurality of records in another cluster within a same group.

In another aspect of the invention, there is a computer program product including a computer readable storage medium having program instructions embodied therewith. The program instructions are executable by a computing device to cause the computing device to identify a plurality of records, each record having one or more attributes; standardize each of the plurality of records; assign an index to one or more of the one or more attributes; cluster the standardized plurality of records in parallel into one or more clusters, each cluster including records having the same index, the one or more clusters being in a group; and assign a pair of groups including a first group of one or more clusters and a second group of one or more clusters.

In another aspect of the invention, there is system including a processor, a computer readable memory, and a computer readable storage medium. The system includes program instructions to identify a plurality of records, each record having one or more attributes; program instructions to standardize each of the plurality of records; program instructions to assign an index to one or more of the one or more attributes; program instructions to cluster the standardized plurality of records in parallel into one or more clusters, each cluster including records having the same index, the one or more clusters being in a group; program instructions to form one or more groups, each group including one or more clusters sharing a same index; and program instructions to assign a pair of groups including a first group of one or more clusters and a second group of one or more clusters. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
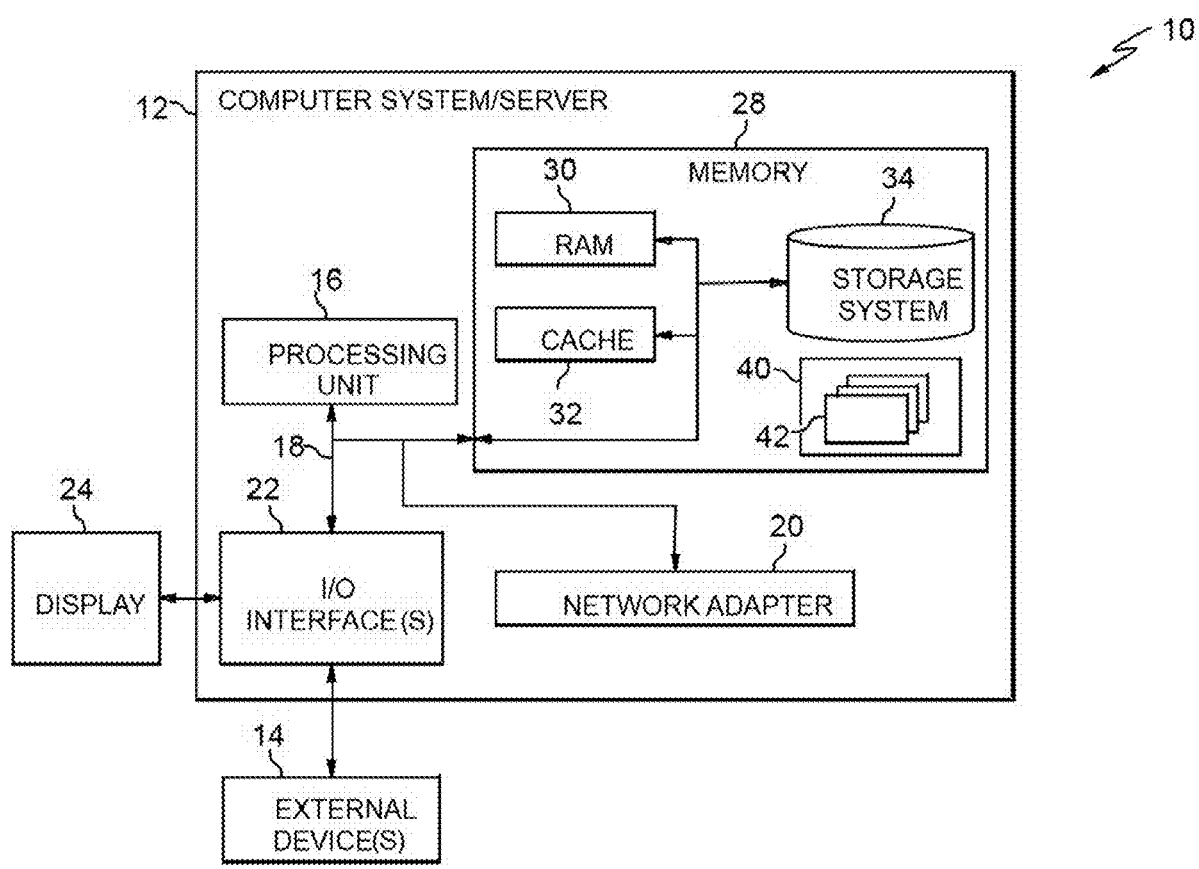
FIG. 1 depicts a cloud computing node according to an embodiment of the present invention.

The present invention relates generally to record linkage and, more particularly, to parallelized record linkage. Record linkage (RL) is the task of finding records in a data set that refer to the same entity across different data sources (e.g., data files, books, websites, and databases). Record linkage is useful when correlating data sets stored in entities that may not share a common identifier because of, e.g., differences in record shape, storage location or preference. Currently, record linkage typically takes place in a sequential manner, which may be disadvantageous when dealing with large volume of data (big data).

In embodiments, a method for record linkage uses an indexing (bucketing) and hierarchical clustering approach which outstands significantly for large volumes of data. Because there typically is some dependency between the various data sets, it is typically difficult to distribute the data and perform the linking among a number of different processing nodes in a distributed network. In addition, if one or more of the processing nodes in the distributed network fails, it is advantageous to ensure that the linking process is able to take place as intended. Accordingly, it is advantageous to have a method to distribute the process among different nodes while taking into account the dependency between the attributes of the data sets, and to have an ability to perform the linking of large data sets even if some of the processing nodes fail or are inoperative for any reason.

In embodiments, a parallelized record linkage process includes a distributed and parallel way of clustering/smart indexing the records based on one or more of the critical attributes of the record, and a distributed and parallel approach for aggregating low level clustering information to generate finer clusters. Embodiments include an approach that combines sets of clusters pairwise, combining the two sets of clusters using a mechanism which employs sub-cluster matching between a cluster and a set of clusters. The process of linking can be assumed as finished at some intermediary step itself depending upon the matching threshold criteria, thereby improving the performance of the linking process. In embodiments, the process also includes a tolerance for the fault of a few nodes, e.g., a processing node failing or going down for any reason (failure, maintenance, and the like).

Embodiments of the invention improve the technology of record linkage by providing parallelized record linkage that can sustain failure of some of the processing nodes performing the record linkage. Embodiments of the invention employ an unconventional arrangement of steps including: identifying a plurality of records, each record having one or more attributes; standardizing each of the plurality of records; assigning an index to one or more of the one or more attributes; providing instructions for clustering the standardized plurality of records in parallel into one or more clusters, each cluster including records having the same index, the one or more clusters being in a group; receiving one or more groups, each group including one or more clusters sharing a same index; and linking one or more of the plurality of records in a cluster with another one or more of the plurality of records in another cluster within a same group. The steps themselves are unconventional, and the combination of the steps is also unconventional. For example, the steps of standardizing each of the plurality of records and assigning an index to one or more of the one or more attributes creates new information that does not exist in the system, and this new information is then used in subsequent steps in an unconventional manner, namely to cluster the standardized plurality of records in parallel into one or more clusters, each cluster including records having the same index. Embodiments of the invention also utilize elements and/or techniques that are necessarily rooted in computer technology, including database organization and record linkage technology. Embodiments improve the functioning of a computer combination, in this case a server and a client device, and more specifically includes aspects that are directed to a specific improvement of the operation of the mobile device when use in communication between users, and thus are directed to a specific implementation of a solution to a problem in record linkage, and more specifically in parallelized record linkage.

Embodiments provide an efficient way of parallelizing the record linkage process for large amount of data coming from different sources; an effective approach of distributing the task of indexing/clustering/bucketing of the records among various secondary nodes; a novel approach of parallelizing the task of aggregation of groups of clusters; a novel way of aggregating the clustering information obtained from different secondary nodes using the mechanism of sub-cluster checking. Even if some of the processing nodes fail or are inoperative, the record linking process can be continued further, and the record linking task can be finished if the clusters obtained via other processing nodes satisfy the threshold criteria. In embodiments, if all the clusters satisfy the threshold criteria, the record linking process may end, thereby improving the performance of the record linking process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
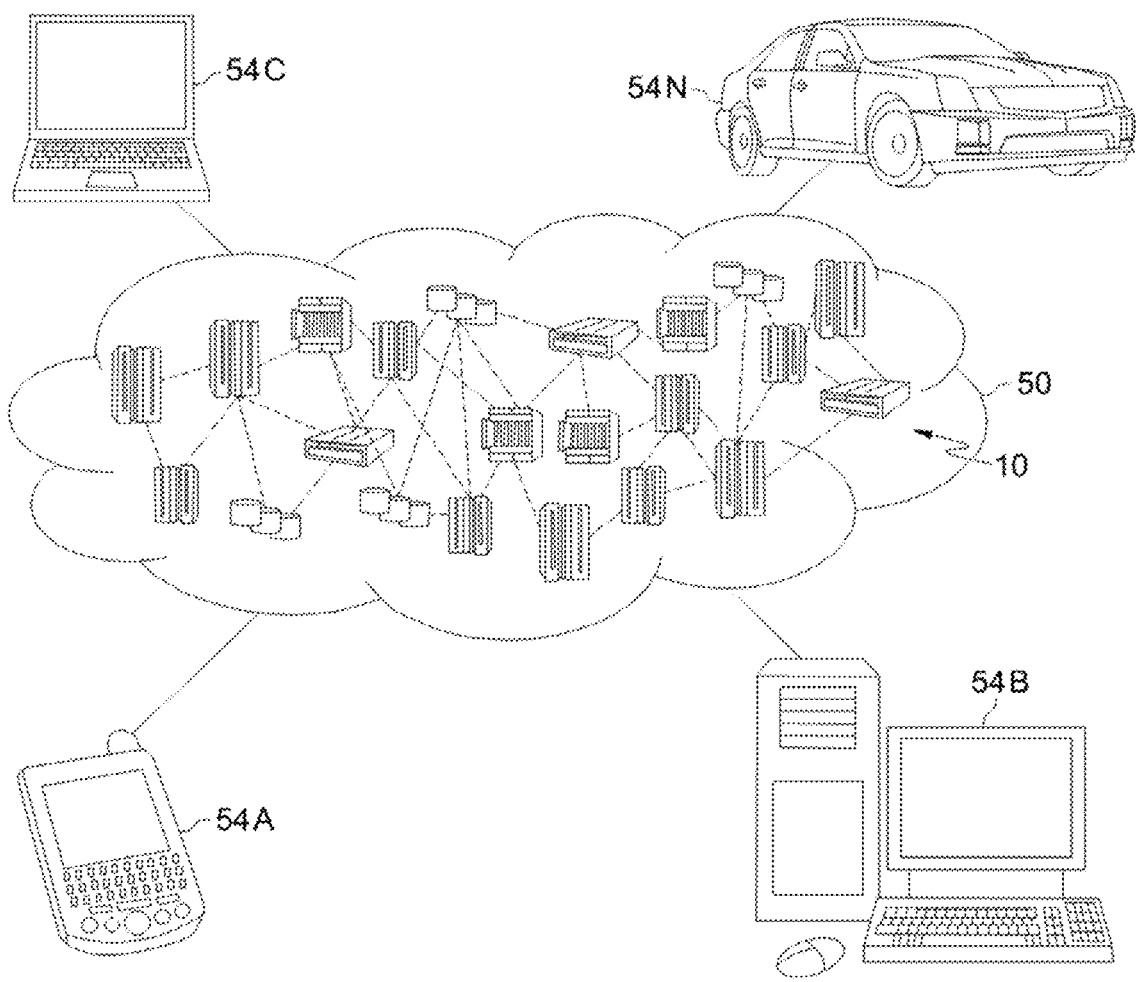
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
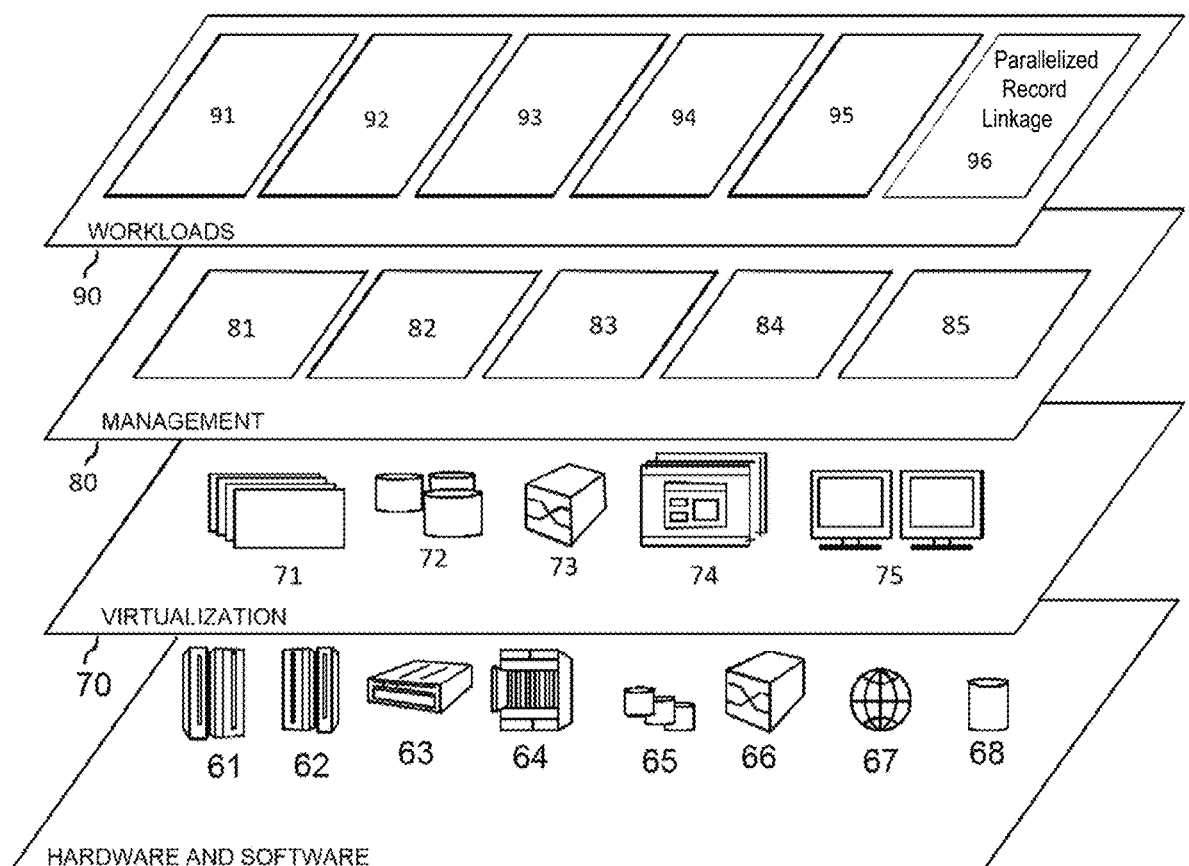
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parallelized record linkage 96.

Implementations of the invention may include a computer system/server 12 of FIG. 1 in which one or more of the program modules 42 are configured to perform (or cause the computer system/server 12 to perform) one of more functions of the parallelized record linkage 96 of FIG. 3. For example, the one or more of the program modules 42 may be configured to: identify a plurality of records, each record having one or more attributes; standardize each of the plurality of records; assign an index to one or more of the one or more attributes; provide instructions for clustering the standardized plurality of records in parallel into one or more clusters, each cluster including records having the same index, the one or more clusters being in a group; receive one or more groups, each group including one or more clusters sharing a same index; and link one or more of the plurality of records in a cluster with another one or more of the plurality of records in another cluster within a same group.

Figure 4:
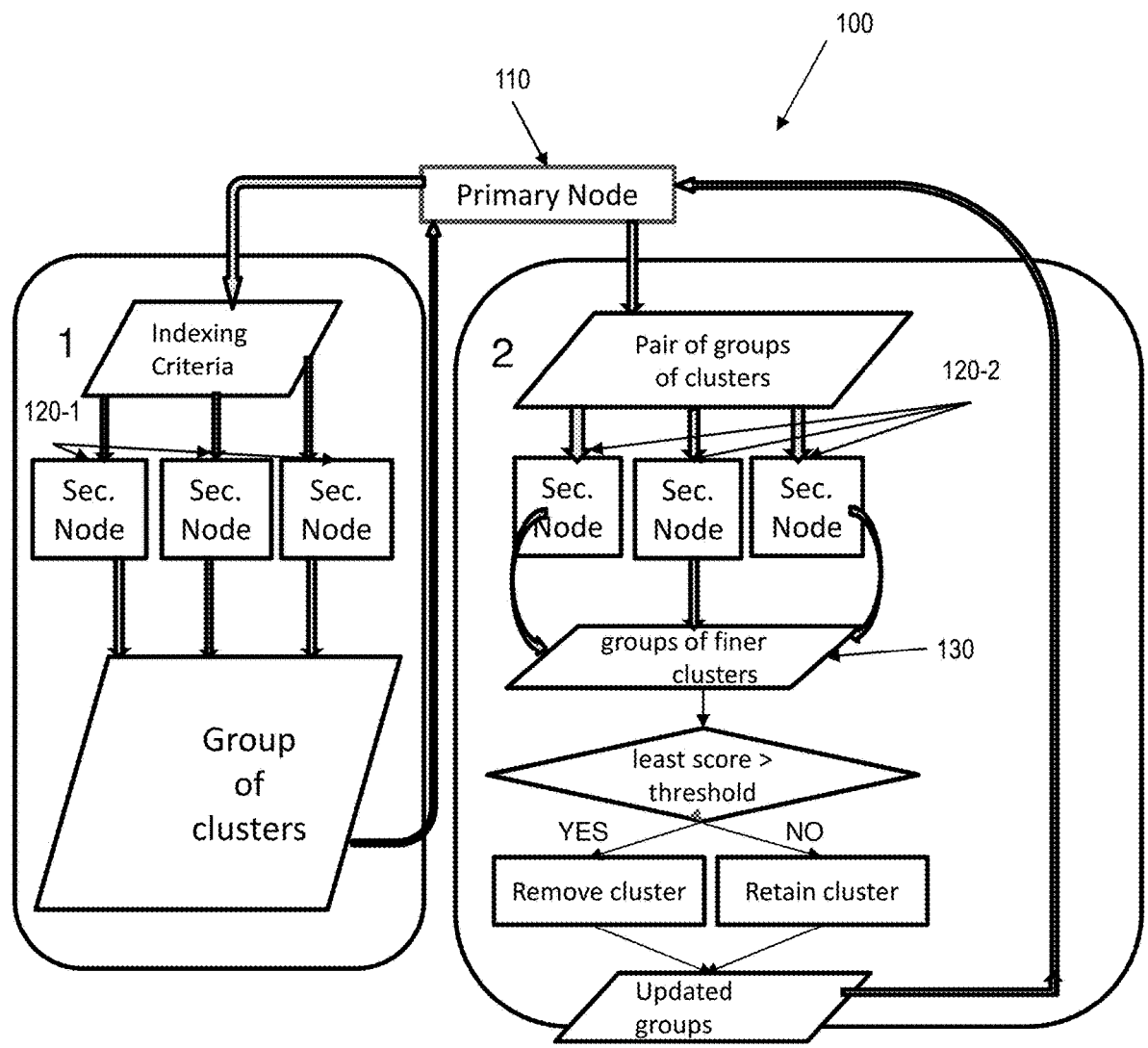
FIG. 4 shows a block diagram of an exemplary environment in accordance with aspects of the invention.

FIG. 4 shows a block diagram of an exemplary environment in accordance with aspects of the invention. In embodiments, the environment 100 includes a primary node 110 operatively coupled to a plurality of secondary nodes 120-1 and 120-2. In embodiments, the secondary nodes 120-1 and 120-2 are subsets of each other. In embodiments, the secondary nodes 120-1 and 120-2 are distinct nodes. In embodiments, when there is a large volume of data having records coming from different data sources, the records being possibly formatted differently, in order to link same records in such a large volume of data, the primary node 110 defines a set of indexing attributes, also referred to as bucketing attributes. In embodiments, the indexing attributes are single attributes or combinations of several attributes. In embodiments, the indexing attributes include any combination of a name, a social security number, an address, a zip code, or a date of birth. In embodiments, the primary node 110 standardizes each of the records by redefining each of the plurality of records into a common format. For example, in the case of a record including a name such "Robert" having an identification (ID) number equal to "123-45-6789," the primary node 110 standardizes the record by defining the record as "robert" and "123456789," and each of "Robert" and "123456789" are the indexing attributes of that record.

In embodiments, the primary node 110 assigns an index to one or more of the attributes of each standardized record. For example, the index includes a hash value that identifies the corresponding attribute of each standardized record. In the example above, the primary node 110 assigns a "Name" index to the attribute "Robert" and an "ID" index to the attribute "123456789." Similarly, the primary node 110 assigns each name attribute to the "Name" index and each ID attribute to the "ID" index for all of the records that are the subject of the linkage.

In embodiments, the primary node 110 provides instructions to a first set of secondary nodes 120-1 to cluster the standardized plurality of records into one or more clusters at each secondary node 120-1, where each cluster includes records having the same index, the one or more clusters being in a group. In embodiments, clusters of standardized records that share the same index are transmitted from the first set of secondary nodes 120-1 back to the primary node 110. In embodiments, clustering the standardized plurality of records in groups of one or more clusters, each cluster corresponding to a same index, is performed by each one of the secondary nodes 120-1. In embodiments, the groups of clusters are transmitted back from the first set of secondary nodes 120-1 to the primary node 110.

In embodiments, there are as many secondary nodes 120-1 as there are attributes, so that each secondary node 120-1 identifies the existence of the same attribute in all of the records and thus clusters the records having a same index.

In embodiments, once the primary node 110 receives the clusters from the first set of secondary nodes 120-1, the primary node 110 transmits, to each one of a second set of secondary nodes 120-2, two groups of clusters, each group of clusters including one or more clusters. Accordingly, in embodiments, there are half as many secondary nodes 120-2 as there are secondary nodes 120-1. In embodiments, each secondary node 120-2 determines, for each cluster in the first group of the two groups, whether that cluster is a subset of another cluster in the second group of the two groups. In embodiments, in response to determining that the cluster in the first group is not a subset of any cluster in the second group, the cluster in the first group is removed from the first group and each record of the removed cluster is formed as an individual cluster. In embodiments, the secondary node 120-2 also determines, for each cluster in the second group, whether that cluster is a subset of another cluster in the first group. In embodiments, in response to determining that the cluster in the second group is not a subset of any cluster in the first group, the cluster in the second group is removed from the second group and each record of the removed cluster is formed as an individual cluster. In embodiments, once the above operation is performed, each secondary node 120-2 includes a single group including the remaining clusters 130. In embodiments, the remaining clusters 130 are referred to as finer clusters because they have not been removed from either the first group or the second group, and thus have not been determined to be subsets of each other. As a result, the finer remaining clusters 130 include linking information that is richer and more reliable because they include more data attributes due to aggregation of records.

In embodiments, each secondary node 120-2 compares the records included therein with each other. In embodiments, each secondary node 120-2 establishes a similarity score between the various records. Specifically, the secondary node 120-2 creates a two-dimensional matrix of the similarity scores between all the records within the cluster. Each secondary node 120-2 also establishes a threshold score. Alternatively, in embodiments, the primary node 110 establishes the threshold score. In embodiments, the secondary node 120-2 compares the threshold score with each of the similarity scores of the two-dimensional matrix. In response to each of the similarity scores within each two-dimensional matrix being greater than the threshold score, the secondary node 120-2 determines that the records within the cluster are sufficiently linked, and removes the cluster. In response to one of the similarity scores being lower than the threshold score, the records are considered to be insufficiently linked, and the cluster remains and is transmitted back as a single group to the primary node 110. The same operation as discussed above is performed for each of the secondary nodes 120-2, and each secondary node 120-2 transmits back any remaining clusters as a single group to the primary node 110. In embodiments, as a result, the primary node 110 receives at most a single group from each secondary node 120-2, the single group including a cluster that does not include records that are determined to be linked.

In embodiments, the primary node 110 transmits two single groups to each of additional secondary nodes (not shown) which are a subset of the secondary nodes 120-2, each updated groups including a single cluster, and each additional secondary node compares the cluster included in each group with each other, as discussed above with respect to secondary nodes 120-2. Accordingly, a number of additional secondary nodes equal to half of the secondary nodes 120-2 continue the aggregation of clusters during further steps of aggregation of records as described above.

In embodiments, every secondary node 120-1 receives the entire dataset of records, and processes the indexing and clustering of the entire dataset based on the attribute the secondary node 120-1 is designated for, and creates, as discussed above, a group of clusters. In embodiments, after multiple cycles of aggregation according to the above description, only one group of clusters remains, the group of clusters including records that are not linked to each other.

In embodiments, when a new record is added to the database, the primary node 110 sends the attributes of the new record to the secondary nodes 120-1 for a first level of clustering and indexing as discussed above. In embodiments, if the new record falls in any of the existing clusters in any of the secondary nodes 120-1, then a similarity score is determined between the new record and the other records existing in each of the other existing clusters. In embodiments, as discussed above, the similarity score determines whether the new record can be linked to the other records based on whether the similarity score between the new record and the other records existing in each of the other existing clusters is greater than the threshold score. In embodiments, if the similarity score of the new record is not greater than the threshold score, the records are considered to be insufficiently linked, and the secondary node 120-1 creates a new single entity cluster for the new record. In embodiments, if the similarity score of the new record is greater than the threshold score, the new record is removed because the similarity score indicates that the new record is linked to one of the existing records.

In embodiments, each of the primary node 110 and the secondary nodes 120-1 and 120-2 is a program housed in, and running on, a computer device including one or more components of the computer system/server 12 illustrated in FIG. 1. In embodiments, the secondary nodes 120-1 and 120-2 are subsets of each other. In other embodiments, the secondary nodes 120-1 and 120-2 are distinct from each other. In embodiments, the primary node 110 and the secondary nodes 120-1 and 120-2 are controlled by a single corporate entity or enterprise.

Figure 5:
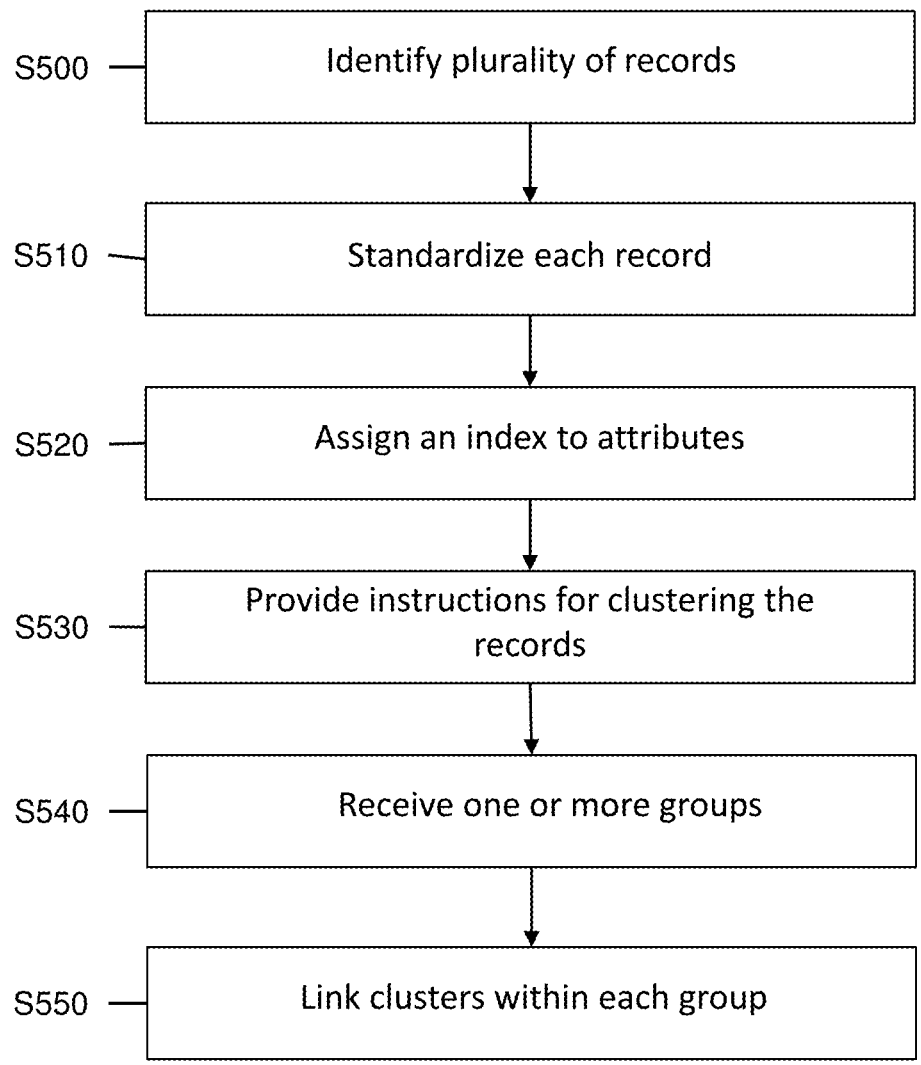
FIG. 5 shows a flowchart of an exemplary method in accordance with aspects of the invention.

FIG. 5 shows a flowchart of an exemplary method in accordance with aspects of the present invention. Steps of the method may be carried out in the system of FIG. 4 and are described with reference to elements depicted in FIG. 4.

At step S500, the system identifies a plurality of records. In embodiments, and as described with respect to FIG. 4, the primary node 110 defines a set of indexing attributes. In embodiments, the attributes are single attributes or combinations of several attributes. In embodiments, the attributes include a name, a social security number, an address, a zip code, or a date of birth.

At step S510, the system standardizes each record. In embodiments, and as described with respect to FIG. 4, the primary node 110 standardizes each of the records by redefining each of the plurality of records into a common format.

At step S520, the system assigns an index to the attributes of each record. In embodiments, and as described with respect to FIG. 4, the primary node 110 assigns an index to one or more of the attributes of each standardized record. For example, the index includes a hash value that identifies the corresponding attribute of each standardized record.

At step S530, the system provides instructions for clustering the records. In embodiments, and as described with respect to FIG. 4, the primary node 110 provides instructions to a first set of secondary nodes 120-1 to cluster the standardized plurality of records into one or more clusters at each secondary node 120-1, where each cluster includes records having the same index, the one or more clusters being in a group. In embodiments, the group that includes one or more clusters that share the same index are transmitted from the first set of secondary nodes 120-1 back to the primary node 110. In embodiments, clustering the standardized plurality of records in groups of one or more clusters is performed by each one of the secondary nodes 120-1.

At step S540, the system receives one or more groups. In embodiments, and as described with respect to FIG. 4, the groups of clusters are transmitted back from the first set of secondary nodes 120-1 to the primary node 110.

At step S550, the clusters are linked within each group. In embodiments, and as described with respect to FIG. 4, once the primary node 110 receives the clusters from the first set of secondary nodes 120-1, the primary node 110 starts the linking operation of the clusters.

Figure 6:
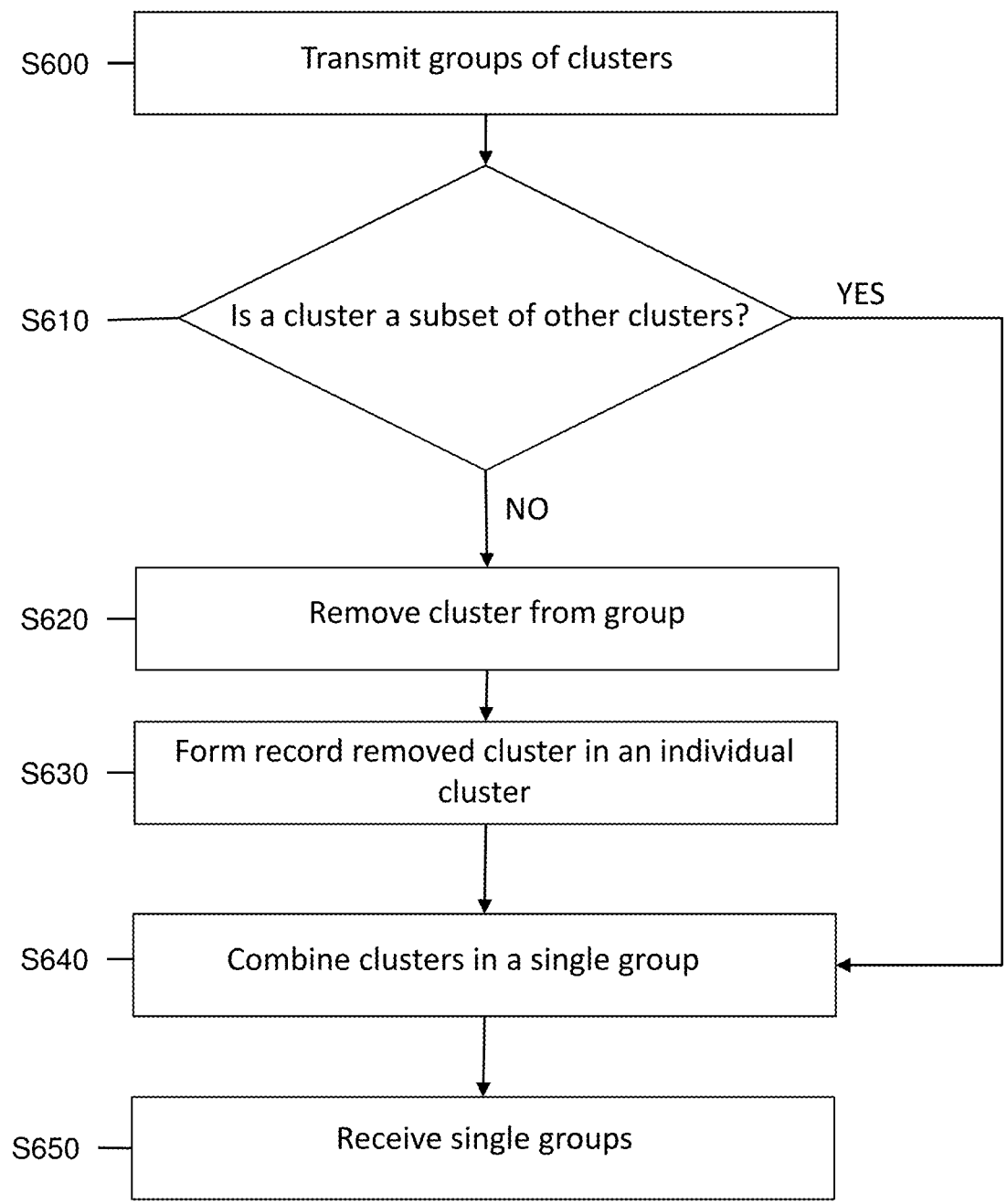
FIG. 6 shows a flowchart of an exemplary method in accordance with aspects of the invention.

FIG. 6 shows a flowchart of an exemplary method of the linking operation of the clusters, in accordance with aspects of the invention. In embodiments, the steps illustrated in FIG. 6 correspond to the linking step S550 of FIG. 5.

At step S600, the system transmits a group of clusters. In embodiments, and as described with respect to FIG. 4, the primary node 110 transmits, to each one of a second set of secondary nodes 120-2, two groups of clusters, each group of clusters including one or more clusters.

At step S610, the system determines whether any cluster of the first of the two groups is a subset of any cluster of the second of the two groups. In embodiments, and as described with respect to FIG. 4, each secondary node 120-2 determines, for each cluster in any one of the two groups, whether that cluster is a subset of another cluster in the other one of the two groups.

If the cluster is not a subset of another cluster, then at step S620, the cluster is removed from the group. In embodiments, and as described with respect to FIG. 4, each secondary node 120-2 determines, for each cluster in the first group of the two groups, whether that cluster is a subset of another cluster in the second group of the two groups. In embodiments, in response to determining that the cluster in the first group is not a subset of any cluster in the second group, the cluster in the first group is removed from the first group. In embodiments, and as described with respect to FIG. 4, the secondary node 120-2 also determines, for each cluster in the second group, whether that cluster is a subset of another cluster in the first group. In embodiments, in response to determining that the cluster in the second group is not a subset of any cluster in the first group, the cluster in the second group is removed from the second group.

At step S630, in response to determining that the cluster in the second group is not a subset of any cluster in the first group, each record of the removed cluster is formed as an individual cluster. Also at step S630, in response to determining that the cluster in the first group is not a subset of any cluster in the second group, each record of the removed cluster is formed as an individual cluster.

At step S640, the individual clusters are grouped in a single group. In embodiments, and as described with respect to FIG. 4, once the above step is performed, each secondary node 120-2 includes a single group including the remaining clusters 130.

At step S650, the system receives the single group including the individual clusters. In embodiments, and as described with respect to FIG. 4, the primary node 110 receives a single group of individual clusters from each secondary node 120-2.

Figure 7:
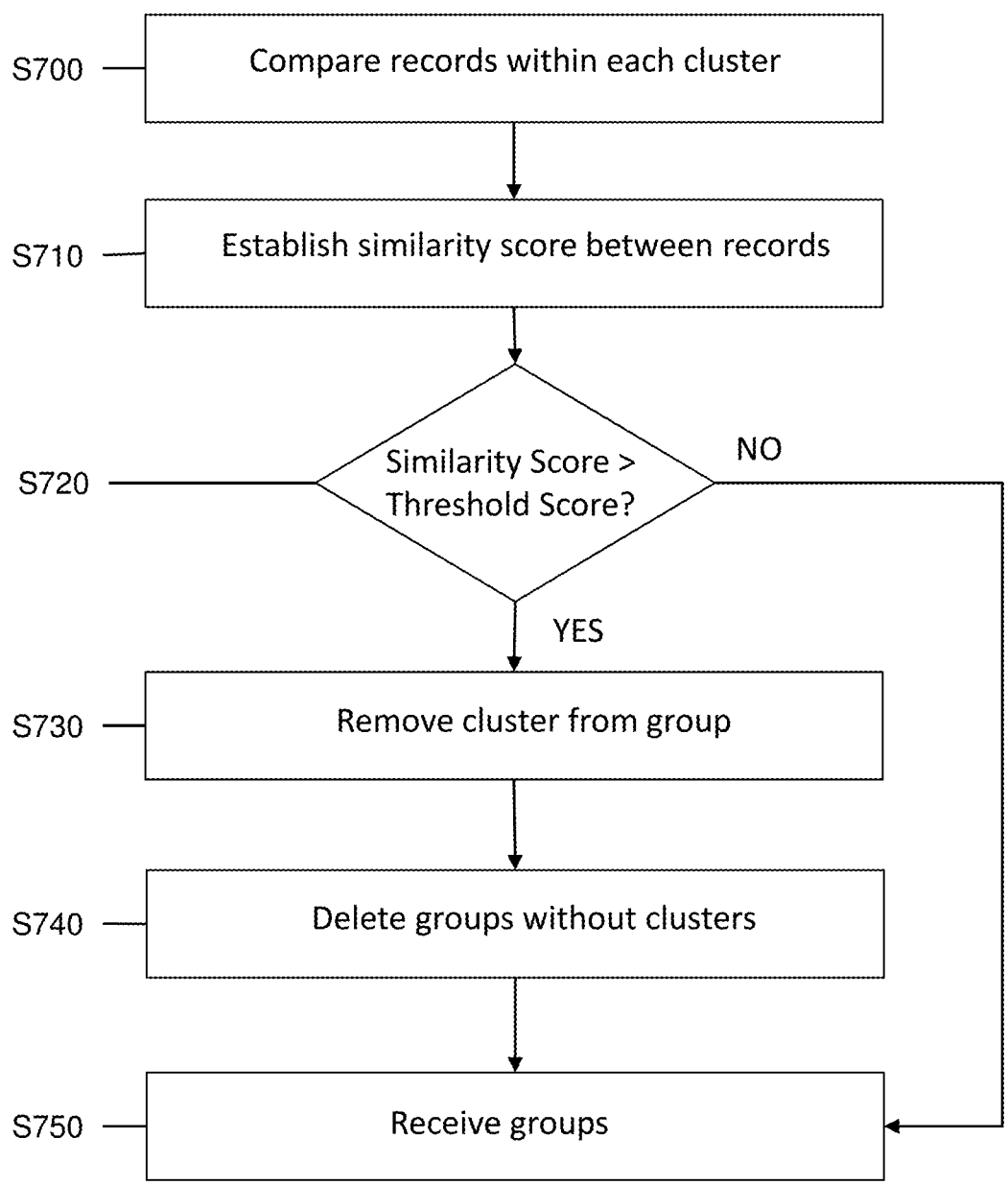
FIG. 7 shows a flowchart of an exemplary method in accordance with aspects of the invention.

FIG. 7 shows a flowchart of an exemplary method in accordance with aspects of the invention. In embodiments, FIG. 7 illustrates steps taking place after step S650 of FIG. 6.

At step S700, the system compares records within each cluster. In embodiments, and as described with respect to FIG. 4, each secondary node 120-2 compares the records included therein with each other.

At step S710, within each cluster, the system establishes a similarity score between all the records within the cluster. In embodiments, and as described with respect to FIG. 4, each secondary node 120-2 establishes a similarity score between the various records. Specifically, the secondary node 120-2 creates a two-dimensional matrix of the similarity scores between all the records within the cluster. Each secondary node 120-2 also establishes a threshold score. Alternatively, the primary node 110 establishes the threshold score.

At step S720, the environment 100 determines whether each of the similarity scores between all the records within a cluster is greater than the threshold score, in which case the system determines that the records within the cluster are sufficiently linked and removes the cluster from the group.

In embodiments, and as described with respect to FIG. 4, in response to each of the similarity scores being greater than the threshold score, at S730, the secondary node 120-2 removes the cluster from the group.

Next, at step S740, the system deletes any group that does not include a cluster.

At step S720, in response to at least one of the similarity scores between the records within the cluster being lower than the threshold score, the records are considered to be insufficiently linked, and the cluster remains unchanged.

At step S750, any remaining clusters are received back. In embodiments, and as described with respect to FIG. 4, each secondary node 120-2 transmits the cluster therein, if the cluster has not been removed, back to the primary node 110.

Figure 8:
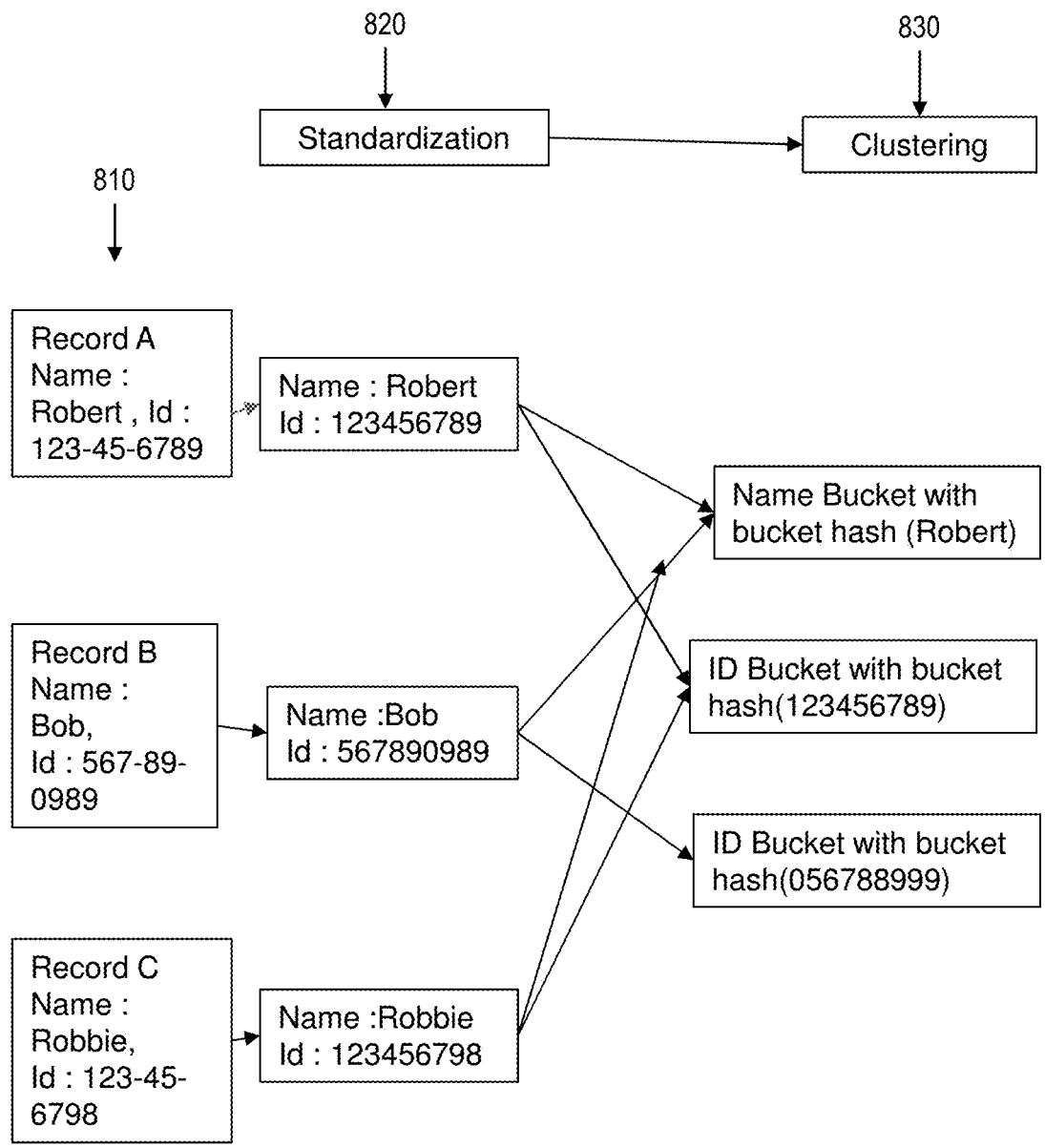
FIG. 8 shows a block diagram of an exemplary process in accordance with aspects of the invention.

FIG. 8 shows a block diagram of an exemplary process in accordance with aspects of the invention. In FIG. 8, a number of records 810 undergo standardization and clustering. In embodiments, the records 810 includes a plurality of attributes such as, e.g., a name, a social security number, an address, a zip code, or a date of birth. In embodiments, the process standardizes each record via standardization 820. In embodiments, and as described with respect to FIG. 4, the primary node 110 standardizes each of the records by redefining each of the plurality of records into a common format. For example, in the case of a record including a name such "Robert" having an identification (ID) number equal to "123-45-6789," the primary node 110 standardized the record by defining the record as "robert" and "123456789," and each of "robert" and "123456789" are the attributes of that record. In embodiments, the process clusters the records via clustering 830. In embodiments, and as described with respect to FIG. 4, the primary node 110 assigns an index to one or more of the attributes of each standardized record. For example, the index includes a hash value that identifies the corresponding attribute of each standardized record. In the example above, the primary node 110 assigns a "Name" index to the attribute "robert" and an "ID" index to the attribute "123456789." Similarly, the primary node 110 assigns each name attribute to the "Name" index and each ID attribute to the "ID" index for all of the records. In embodiments, the primary node 110 provides instructions to a first set of secondary nodes 120-1 to cluster the standardized plurality of records into one or more clusters at each secondary node 120-1, where each cluster includes records having the same index, the one or more clusters being in a group.

Figure 9:
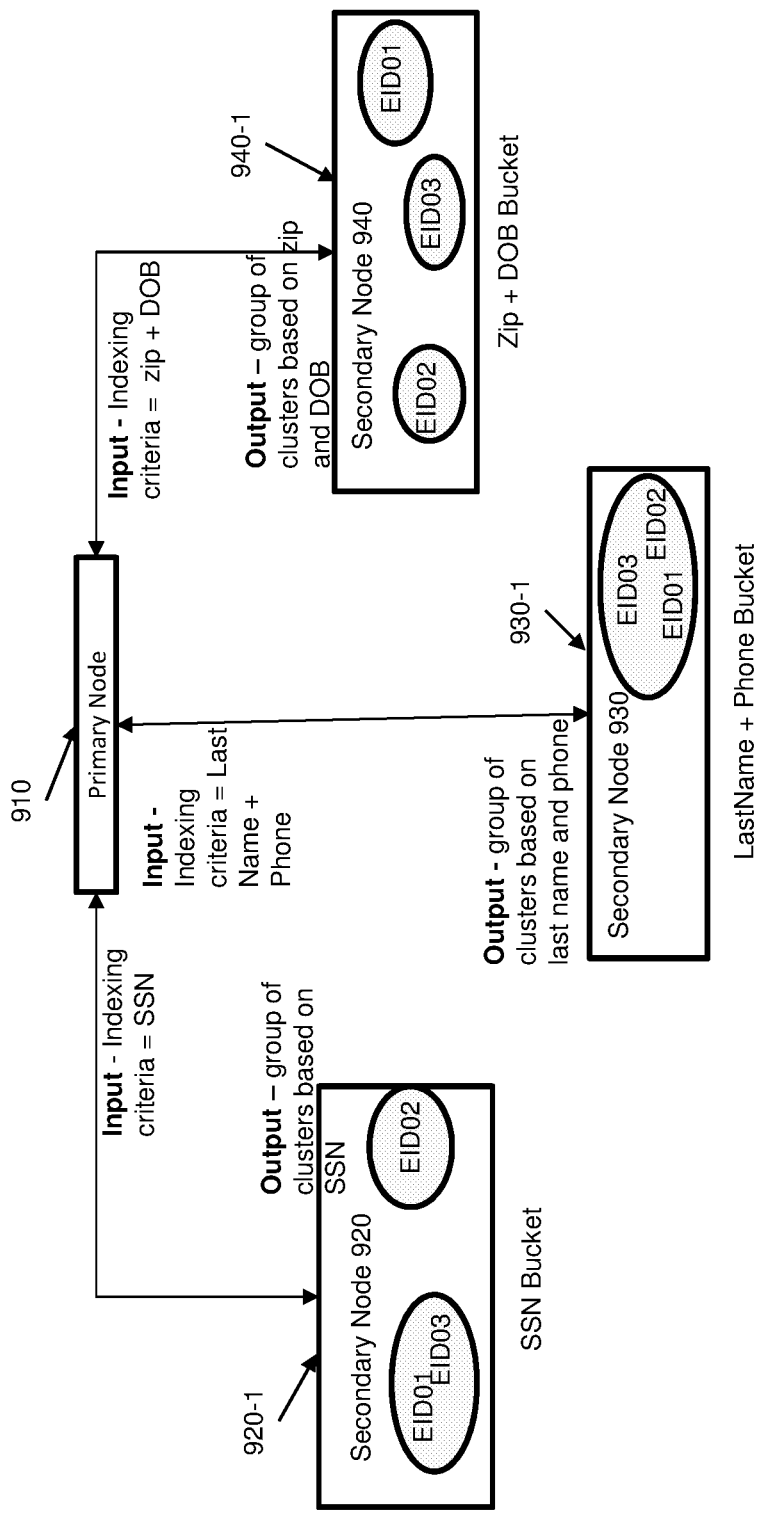
FIG. 9 shows a diagram of an exemplary process in accordance with aspects of the invention.

FIG. 9 shows a diagram of an exemplary process in accordance with aspects of the invention. In FIG. 9, a primary node 910 is operatively coupled with a plurality of secondary nodes 920, 930 and 940. In embodiments, each of the secondary nodes 920, 930 and 940 receives the entirety of the records in a database to be processed, and performs the standardizing/indexing/clustering steps described in FIG. 8 on every record of the database. In embodiments, each of the secondary nodes 920, 930 and 940 processes every record based on the attribute assigned to each of the nodes 920, 930 and 940. In embodiments, each of the secondary nodes 920, 930 and 940 creates one or more groups of clusters 920-1, 930-1 and 940-1, respectively. In embodiments, each of the clusters include one or more records EID01, EID02 and/or EID03. In embodiments, the process illustrated in FIG. 9 corresponds to steps S500-S550 illustrated in FIG. 5.

Figure 10:
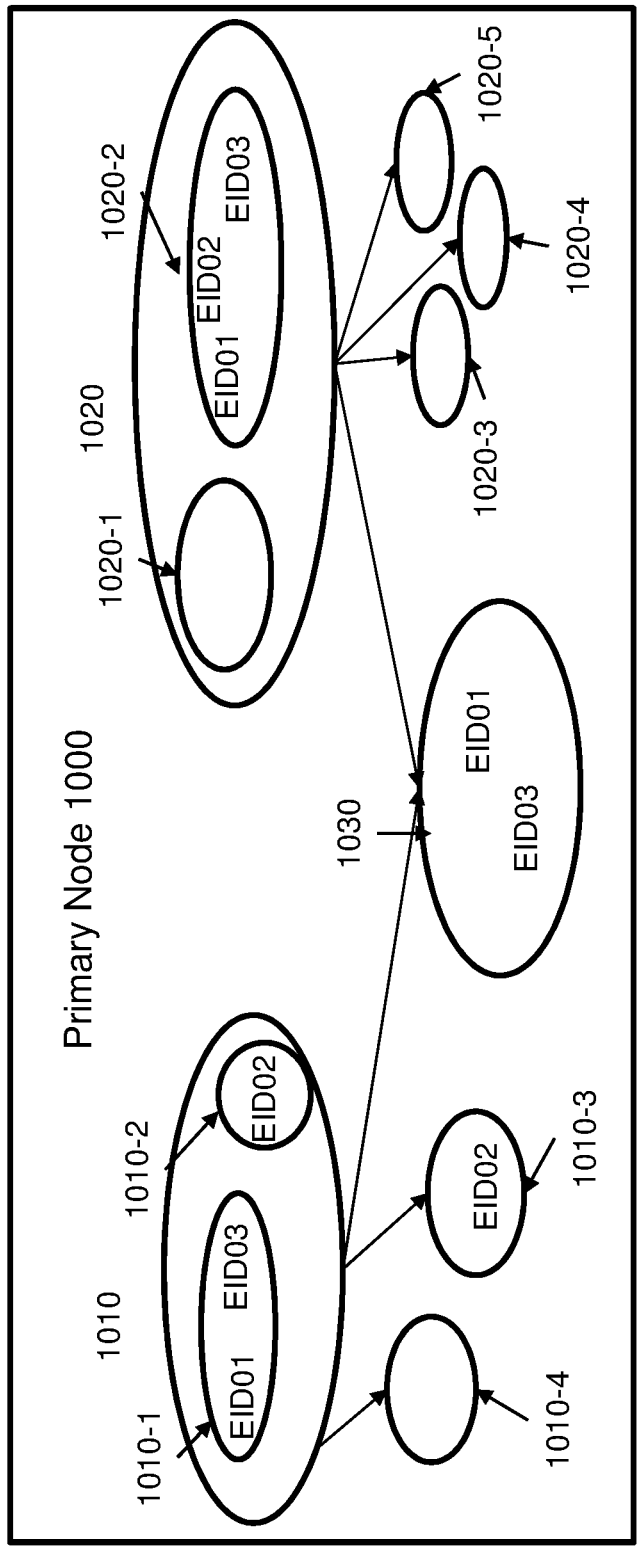
FIG. 10 shows a diagram of an exemplary process in accordance with aspects of the invention.

FIG. 10 shows a diagram of an exemplary process in accordance with aspects of the invention. In embodiments, once the primary node 1000 receives the clusters from a first set of secondary nodes 120-1, as discussed above with respect to FIG. 4, the primary node 1000 transmits, to each one of a second set of secondary nodes 120-2, as also discussed above with respect to FIG. 4, two groups of clusters 1010 and 1020, each group of clusters 1010 and 1020 including one or more clusters 1010-1, 1010-2, 1020-1 and 1020-2. Although FIG. 10 illustrates a total of two (2) clusters per group, there may be more or less clusters for each group 1010 and 1020. In embodiments, each secondary node 120-2 (illustrated in FIG. 4) determines, for each cluster 1010-1, 1010-2 in the first group 1010, whether that cluster is a subset of another cluster 1020-1 and 1020-2 in the second group 1020. In embodiments, in response to determining that the cluster 1020-2 is not a subset of any of the clusters 1010-1 and 1010-2, the cluster 1020-2 is removed from the group 1020 and each record of the removed cluster 1020-2 is formed as an individual cluster 1020-3, 1020-4, 1020-5, 1010-3 and 1010-4. In embodiments, the remaining cluster 1030 is referred to as a finer cluster because the cluster 1030 includes linking information that is richer and more reliable as it includes more data attributes due to aggregation of records EID01, EID02 and EID03.

It should be understood that, to the extent implementations of the invention collect, store, or employ personal information provided by, or obtained from, individuals (for example, personal record present in the database), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying, by a primary computer device, a plurality of records, each record having one or more attributes;
standardizing, by the primary computer device, each record within the plurality of records;
assigning, by the primary computer device, an index to one or more attributes of the standardized plurality of records;
providing, by the primary computer device, instructions for clustering the standardized plurality of records in parallel into one or more clusters, each of the one or more clusters including records having a same index, the one or more clusters being in a group;
receiving, by the primary computer device, one or more groups, each of the one or more groups including one or more clusters sharing the same index;
linking one or more of the plurality of records in a first one of the one or more clusters with another one or more of the plurality of records in a second one of the one or more clusters within a same group; and
finishing, by the primary computer device, the linking in response to all of the one or more clusters within the same group satisfying a threshold, wherein the primary computer device is operatively coupled to a first set of secondary computer devices and a second set of secondary computer devices which are distinct from each other, and wherein there are half as many secondary computer devices in the second set of secondary computer devices as there are in the first set of secondary computer devices.

2. The computer-implemented method of claim 1, wherein:
the clustering the standardized plurality of records is performed by each one of the first set of secondary computer devices, and
each one of the first set of secondary computer devices receives a group of the one or more clusters.

3. The computer-implemented method of claim 1, wherein:
the index includes a hash value; and
at least two of the plurality of records are from different data sources.

4. The computer-implemented method of claim 2, wherein the linking comprises:
transmitting, by the primary computer device, to each one of the second set of secondary computer devices, a first group of one or more clusters and a second group of one or more clusters;
processing, by the second set of secondary computer devices, each cluster in the first group;
processing, by the second set of secondary computer devices, each cluster in the second group;
combining, by the second set of secondary computer devices, the clusters in a single updated group; and
receiving, by the primary computer device, the single updated group from the each one of the second set of secondary computer devices.

5. The computer-implemented method of claim 4, wherein the processing each cluster in the first group comprises:
determining, by the second set of secondary computer devices, whether the cluster is not a subset of any of the clusters in the second group; and
in response to the determining that the cluster is not a subset of a cluster in the second group:
removing, by the second set of secondary computer devices, the cluster from the first group; and
forming, by the second set of secondary computer devices, each record of the removed cluster in an individual cluster.

6. The computer-implemented method of claim 4, wherein the processing each cluster in the second group comprises:
determining, by the second set of secondary computer devices, whether the cluster is not a subset of any of the clusters in the first group; and
in response to the determining that the cluster is not a subset of a cluster in the first group:
removing, by the second set of secondary computer devices, the cluster from the second group; and
forming, by the second set of secondary computer devices, each record of the removed cluster in an individual cluster.

7. The computer-implemented method of claim 4, wherein:
the transmitting comprises transmitting the first group and the second group from the primary computer device; and
the receiving comprises receiving the single updated group at the primary computer device.

8. The computer-implemented method of claim 1, further comprising combining, by the second set of secondary computer devices, the one or more clusters in a single updated group, wherein the combining the clusters comprises:
comparing records in each cluster of the same group;
establishing similarity scores between the records in each cluster of the same group;
in response to all of the similarity scores being greater than the threshold, removing the clusters from the same group;
and
deleting any group that does not include a cluster, wherein the finishing the linking in response to all of the one or more clusters within the same group satisfying the threshold includes creating a two-dimensional matrix of similarity scores between all records within a cluster of the one or more clusters by the second set of secondary computer devices.

9. The computer-implemented method of claim 8, wherein:
the establishing the similarity scores between two records in each cluster of the same group comprises determining a number of components of the attributes in one of the two records and in the other one of the two records that are the same; and
the standardizing comprises redefining each record of the plurality of records into a common format.

10. The computer-implemented method of claim 9, wherein the one or more attributes comprise at least one selected from the group consisting of a name, a social security number, an address, a zip code, and a date of birth.

11. The computer-implemented method of claim 1, further comprising:
adding a new record to the plurality of records;
standardizing the new record;
assigning an index to the standardized new record;
forming an updated cluster by adding the index of the standardized new record to a cluster; and
outputting the updated cluster to the primary computer device.

12. The computer-implemented method of claim 1, wherein a service provider at least one of creates, maintains, deploys and supports the primary computer device.

13. The computer-implemented method of claim 1, wherein the identifying the plurality of records and the standardizing the plurality of records are provided by a service provider on at least one selected from the group consisting of a subscription, advertising, and a fee basis.

14. The computer-implemented method of claim 1, wherein the computer device includes software provided as a service in a cloud environment.

15. A computer program product, the computer program product comprising a computer readable storage medium having program instructions embodied therewith, the program instructions executable by a computing device to cause the computing device to:
identify a plurality of records, each record having one or more attributes;
standardize each of the plurality of records;
assign an index to one or more attributes of the standardized plurality of records;
cluster the standardized plurality of records in parallel into clusters by providing instructions to a first set of secondary computer devices, each cluster including records having a same index, the clusters being in a group;
assign a pair of groups including a first group of clusters and a second group of clusters;
transmit the first group of clusters and the second group of clusters to a second set of secondary computer devices, wherein there are half as many secondary computer devices in the second set of secondary computer devices as there are in the first set of secondary computer devices;
link one or more of the plurality of records in a cluster of the first group of clusters with another one or more of the plurality of records in another cluster within the first group of clusters; and
finish the linking in response to all clusters within the first group of clusters satisfying a threshold.

16. The computer program product of claim 15, further comprising program instructions executable by a computing device to cause the computing device to:
for each cluster in the first group:
determine whether the cluster is not a subset of any of the clusters in the second group;
in response to the determining that the cluster is not a subset of a cluster in the second group:
remove the cluster from the first group; and
form each record of the removed cluster in an individual cluster; and
for each cluster in the second group:
determine whether the cluster is not a subset of any of the clusters in the first group;
in response to the determining that the cluster is not a subset of a cluster in the first group:
remove the cluster from the second group; and
form each record of the removed cluster in an individual cluster; and
combine all the individual clusters in a single updated group; and
receive the single updated group.

17. The computer program product of claim 16, further comprising program instructions executable by a computing device to cause the computing device to:
compare records within each cluster of a group;
establish similarity scores between the records in each cluster;
in response to all of the similarity scores being greater than the threshold, remove the cluster from the group; and
delete any group that does not include a cluster.

18. A system comprising:
a processor, a computer readable memory, and a computer readable storage medium;
program instructions stored on the computer readable storage medium for execution by the processor via the computer readable memory, wherein the program instructions include:
program instructions to identify a plurality of records, each record having one or more attributes;
program instructions to standardize each of the plurality of records;
program instructions to assign an index to one or more of the one or more attributes;
program instructions to cluster the standardized plurality of records in parallel into clusters by a primary node providing instructions to a first set of secondary nodes, each cluster of the clusters including records having a same index;
program instructions to form groups of the clusters, each group of the groups includes the clusters sharing the same index;
program instructions to assign the groups as a first group of clusters and a second group of clusters;
program instructions to transmit the first group of clusters and the second group of clusters to a second set of secondary nodes, wherein there are half as many secondary nodes in the second set of secondary nodes as there are in the first set of secondary nodes;
program instructions to link one or more of the plurality of records in a cluster of the second group of clusters with another one or more of the plurality of records in another cluster within the second group of clusters; and
program instructions to finish the linking in response to all clusters within the second group of clusters satisfying a threshold.

19. The system of claim 18, further comprising:
program instructions to determine whether each cluster in the first group is not a subset of any of the clusters in the second group;
for each cluster in the first group:
program instructions to, in response to the determining that a cluster in the first group is not a subset of a cluster in the second group:
remove the cluster from the first group; and
form each record of the removed cluster in an individual cluster in the first group; and
program instructions to determine whether each cluster in the second group is not a subset of any of the clusters in the first group;
for each cluster in the second group:
program instructions to, in response to the determining that a cluster in the second group is not a subset of a cluster in the first group:
remove the cluster from the second group; and
form each record of the removed cluster in an individual cluster in the second group; and
program instructions to combine all the individual clusters in a single updated group; and
program instructions to receive the single updated group at the primary node.

20. The system of claim 19, further comprising:
program instructions to compare records within each cluster of a group;
program instructions to establish similarity scores between the records in each cluster;
program instructions to, in response to the similarity scores being greater than the threshold, remove the cluster from the group; and
program instructions to delete any group that does not include a cluster from the primary node.

* * * * *